(12) United States Patent
Ellis et al.

(10) Patent No.: US 7,765,219 B2
(45) Date of Patent: Jul. 27, 2010

(54) SORT DIGITS AS NUMBER COLLATION IN SERVER

(75) Inventors: Nigel R Ellis, Redmond, WA (US); Richard L Negrin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 11/065,189

(22) Filed: Feb. 24, 2005

(65) Prior Publication Data
US 2006/0190452 A1    Aug. 24, 2006

(51) Int. Cl.
*G06F 17/30*    (2006.01)
(52) U.S. Cl. ...................................... 707/752
(58) Field of Classification Search ............ 707/5, 707/6, 7
See application file for complete search history.

(56) References Cited

U.S. PATENT DOCUMENTS

| | | | | |
|---|---|---|---|---|
| 5,941,944 | A * | 8/1999 | Messerly ................ | 709/203 |
| 6,356,887 | B1 * | 3/2002 | Berenson et al. ............. | 1/1 |
| 6,795,820 | B2 * | 9/2004 | Barnett ................ | 1/1 |
| 7,315,810 | B2 * | 1/2008 | Azzam et al. ................ | 704/9 |
| 7,324,927 | B2 * | 1/2008 | Weng et al. ................ | 703/2 |
| 2002/0059234 | A1 * | 5/2002 | Gumpertz et al. ............. | 707/7 |
| 2002/0169658 | A1 * | 11/2002 | Adler ....................... | 705/10 |
| 2002/0198869 | A1 * | 12/2002 | Barnett ...................... | 707/3 |
| 2003/0130835 | A1 * | 7/2003 | Azzam et al. ................ | 704/1 |
| 2003/0172053 | A1 * | 9/2003 | Fairweather ................ | 707/1 |
| 2007/0010993 | A1 * | 1/2007 | Bachenko et al. ............. | 704/9 |

OTHER PUBLICATIONS

Blakeley, Jose A., et al., "Distributed/Heterogeneous Query in Microsoft SQL Server", 2005, Proceedings of the 21st International Conference on Data Engineering (ICDE '05)—volumn 00, pp. 1001-1012.*
Weinstein, Vladimir, "Optimizing the Usage of Normalization," May 2002, IBM, 21st International Unicode Conference, pp. 1-22 (powerpoint).*
Davis, Mark, et al., "Unicode Normalization Forms," Apr. 17, 2003, Unicode, pp. 1-25.*
Kay, Michael, XSL Transformations (XSLT) Version 2.0, Aug. 16, 2002, http://www.w3.org/TR/2002/WD-xslt20-20020816/, pp. 1-204.*
Davis, Mark, Unicode Technical Standard #35—Locale Data Markup Language (LDML), http://unicode.org/reports/tr35/tr35-4.html, Dec. 2, 2004, pp. 1-68.*
Davis, Mark, et al., "Unicode Normalization Forms", Unicode 4.0.0, Apr. 2003, 27 pages.
Davis, Mark, et al., "Unicode Collation Algorithm", Jan. 2004, 49 pages.

* cited by examiner

*Primary Examiner*—Neveen Abel Jalil
*Assistant Examiner*—Farhan M Syed
(74) *Attorney, Agent, or Firm*—Workman Nydegger

(57) ABSTRACT

Systems and methods that supply a sort order for strings with defined digit and non-digit tokens, via employing a normalization procedure that assigns numeric values to the digit based tokens, and that further leverages on existing database collations. As such, plugging a particular collation into the sort engine determines a weight for the various characters relative to each other, and in conjunction with the normalization procedure, provides an intuitive sort order for the strings.

13 Claims, 9 Drawing Sheets

| NORMALIZATION FUNCTION | |
| --- | --- |
| INPUT | OUTPUT |
| a1x2 | a011x012 |
| a123456789 | a09123456789 |
| a123456789567a2 | a12123456789567a012 |
| a1a1a1a1a1 | a011a011a0011a011a011 |
| a0001x2 | a011x012 |
| a0000000001x2 | a011x012 |

Fig. 6

SORT DIGITS AS NUMBER COLLATION IN SERVER

TECHNICAL FIELD

This invention generally relates to data processing, and in particular to systems and methods for intuitive sorting of data text strings in a database system.

BACKGROUND OF THE INVENTION

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, and a record includes a set of fields. Records are commonly indexed as rows within a table and the record fields are typically indexed as columns, such that a row/column pair of indices can reference a particular datum within a table. For example, a row may store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. The database application allows the user to compare, sort, order, merge, separate and interconnect the data, so that useful information can be generated from the data.

Sorting algorithm of data string is typically a dominant procedure in databases. For example, accounting and inventory programs in databases routinely: calculate complicated mathematical formulas; sort data strings; and extract mathematical or textual data. It has been estimated that virtually every important aspect of programming includes sorting and searching, wherein a significant percent of the run time of a computer is spent in sorting.

At the same time, typically conventional sort order algorithms/engines may not provide an intuitive sort order of data strings. As such, it can become necessary for existing databases to build new collations to supply an intuitive sorting for the data strings. Nonetheless, such can procedures typically increase expenses associated with employing the database. Also, speed and efficiency of the sort order could be adversely affected by such procedures.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention facilitates a sort order for data strings with defined digit and non-digit tokens, via a sort order engine that employs a normalization component to assign numeric values to the digit based tokens, and which further leverages on existing database collations to return intuitive sorting for an end user/program. Accordingly, an intuitive sort order for the data strings can be supplied, wherein plugging a particular collation into the sort engine determines a weight for the various characters relative to each other, and provides for an intuitive order for sorting a data string before another. As such, a requirement for building a new collation that supplies an intuitive sorting of strings is mitigated, as an existing sort algorithm can be coupled with a normalization process to leverage on existing database systems.

According to a methodology of the subject invention, a sequence of characters in a data string can be tokenized into a series of adjacent digit and non-digit characters. Thus, the original string can be composed of digit and non-digit groups or sequences, each logically parsed into a respective token. Subsequently and for any digit character sequence, the leading zeroes associated therewith can be stripped to form a stripped digit group. Next, the remaining number of digits is counted in the stripped digit group, and such count is placed as a significant digit immediately to the left of this group. Such significant digit can facilitate a convergence of the sort order to a logical subset of a group, (e.g., the representative significant digit of "2" represents numbers from 10-99, whereas a representative significant digit of "3" represents numbers from 100-999, and the like).

The representative digit can also be part of a zero padding digit sequence that can be placed in front of the stripped digit group. The zero padding digit sequence can be a function of the length for the numeric sequence(s) of the string to be sorted. For example, the significant digit can be tailored to a database condition, to include any number of zero digits that a string to be analyzed so requires (e.g., a three digit zero padding for nine hundred-ninety-nine numbers, and the like.) In a related aspect, an optimization can be provided wherein a digit sequence of zero(es) can be ignored and removed as a token from the group.

In yet a further aspect of the subject invention, strings with non-western alphabet or digit characters (e.g., Japanese, and the like) can be initially examined to distinguish the digits from the non-digits. Subsequently and to sort such string, the normalization can be applied to the digit characters of the string or their western digit equivalent. Similarly, the subject invention can be employed for sorting dates based on a variant sort algorithm (e.g., for variant data types) that ranks a date relative to an integer. Accordingly, user defined date formats (e.g., date-month-year, year-month-date, and the like) can be sorted via the subject invention.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 6 illustrates normalized data strings according to an exemplary methodology of the subject invention.

DETAILED DESCRIPTION OF THE INVENTION

Figure 1:
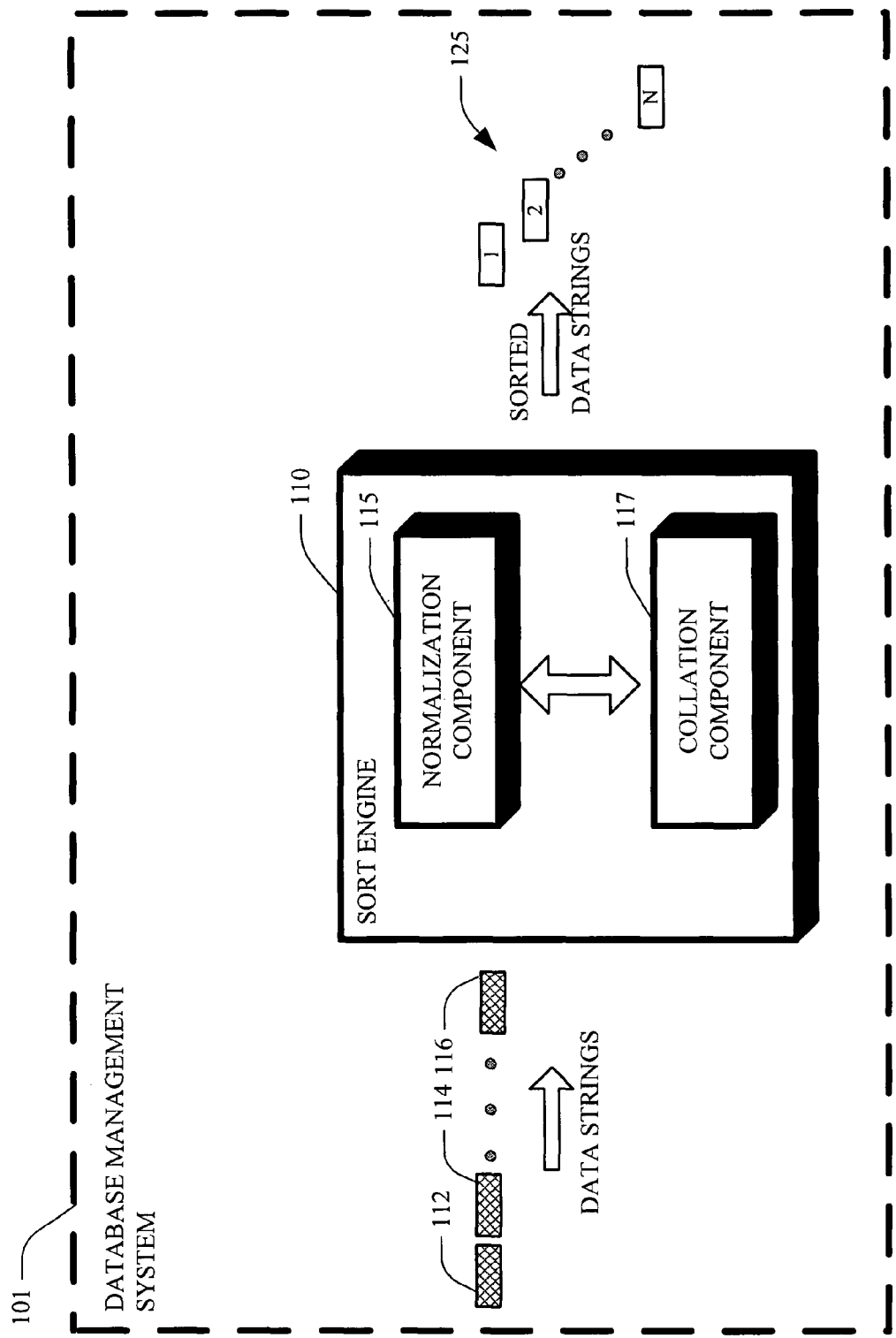
FIG. 1 illustrates a sort order engine in accordance with an aspect of the subject invention, which operates on a plurality of data strings as part of a Database Management System (DBMS).

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention provides for systems and methods that supply a sort order for strings with defined digit and non-digit tokens, via a sort order engine that employs a normalization component. Referring initially to FIG. 1, a sort order engine in accordance with an aspect of the subject invention is illustrated, which operates on a plurality of strings 112, 114, 116, as part of a Database Management System (DBMS) 101. The DBMS 101 can further include various software subsystems (not shown) for storing, retrieving, and manipulating information in database tables, wherein under the command of DBMS, the system receives user commands and data through user interface (not shown). Such Interface can include a built-in query surface or editor for accessing and processing database information. Additional application programs, such as DBMS application software, can be loaded (e.g., transferred from a storage into memory) for further controlling the operation of DBMS 101.

The data strings 112, 114, 116 can include a sequence of characters, wherein the sequence of characters can be tokenized into a series of adjacent digit and non-digit characters, as explained in detail infra. As illustrated in FIG. 1, the sort order engine 110 incorporates a normalization component 115 that assigns numeric values to the digit based tokens of strings 112, 114, and 116, to supply an intuitive sort order 125 (where N is an integer) as the output. Accordingly, an intuitive sort order for the strings can be provided, wherein plugging a particular collation 117 into the sort engine 110 determines a weight for the various characters relative to each other, and for sorting a string before another at 125. As such, a requirement for building a new collation that supplies an intuitive sorting of strings is mitigated, since an existing sort algorithm can be coupled with a normalization process to leverage on existing database systems.

Figure 2:
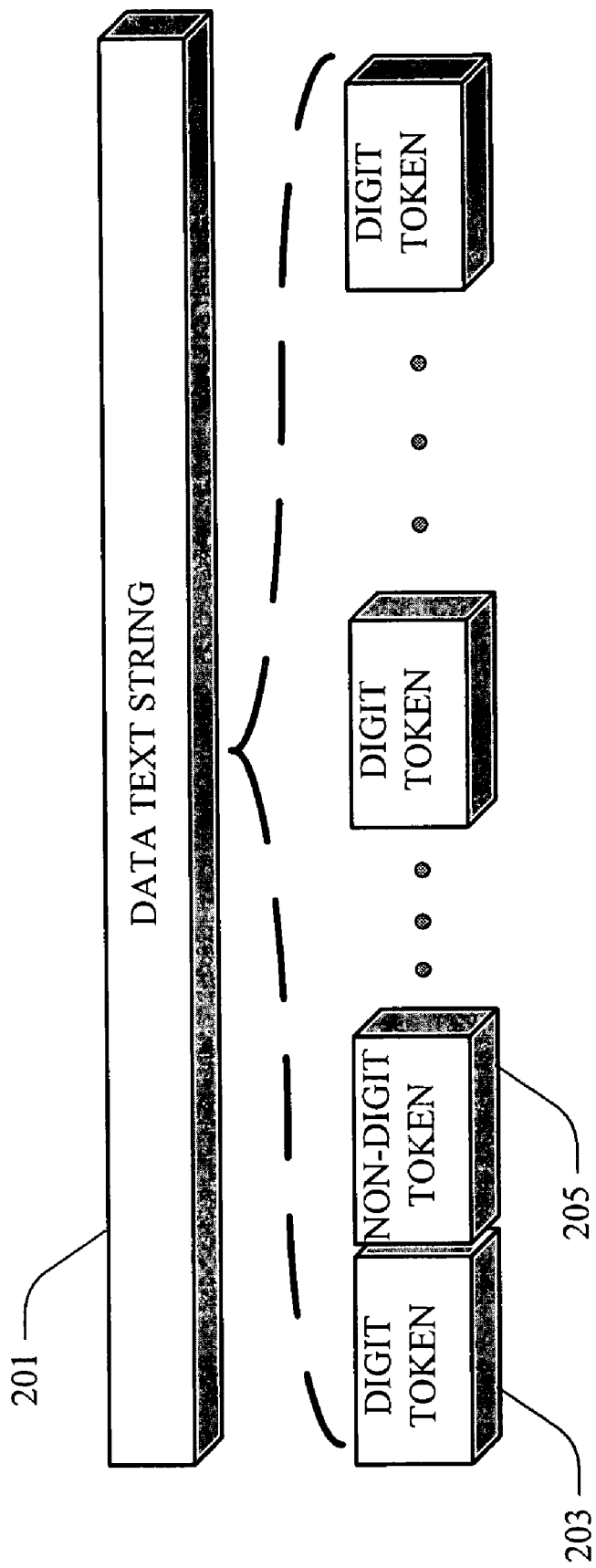
FIG. 2 illustrates a data string that can be normalized in accordance with an aspect of the subject invention.

FIG. 2 illustrates a data text string that can be normalized in accordance with an aspect of the subject invention. The data text string 201 can be a text string input that can be readily parsed into digit and non-digits tokens. The data text string 201 can include a sequence of characters, wherein the sequence of characters can be tokenized into a series of adjacent digit character token(s) 203 and non-digit character token(s) 205, as illustrated in FIG. 2. It is to be appreciated that the digit and non-digit tokenized scheme of FIG. 2 is exemplary, and other arrangements are well within the realm of the subject invention. By normalizing the data text string 201 in accordance with the subject invention, an intuitive sort order for the text strings can be provided, whereby in conjunction with a particular collation, a weight for the various characters relative to each other can be determined. As such, a requirement for building a new collation that supplies an intuitive sorting of strings is mitigated, since an existing sort algorithm can be coupled with a normalization process to leverage on existing database systems.

Figure 3:
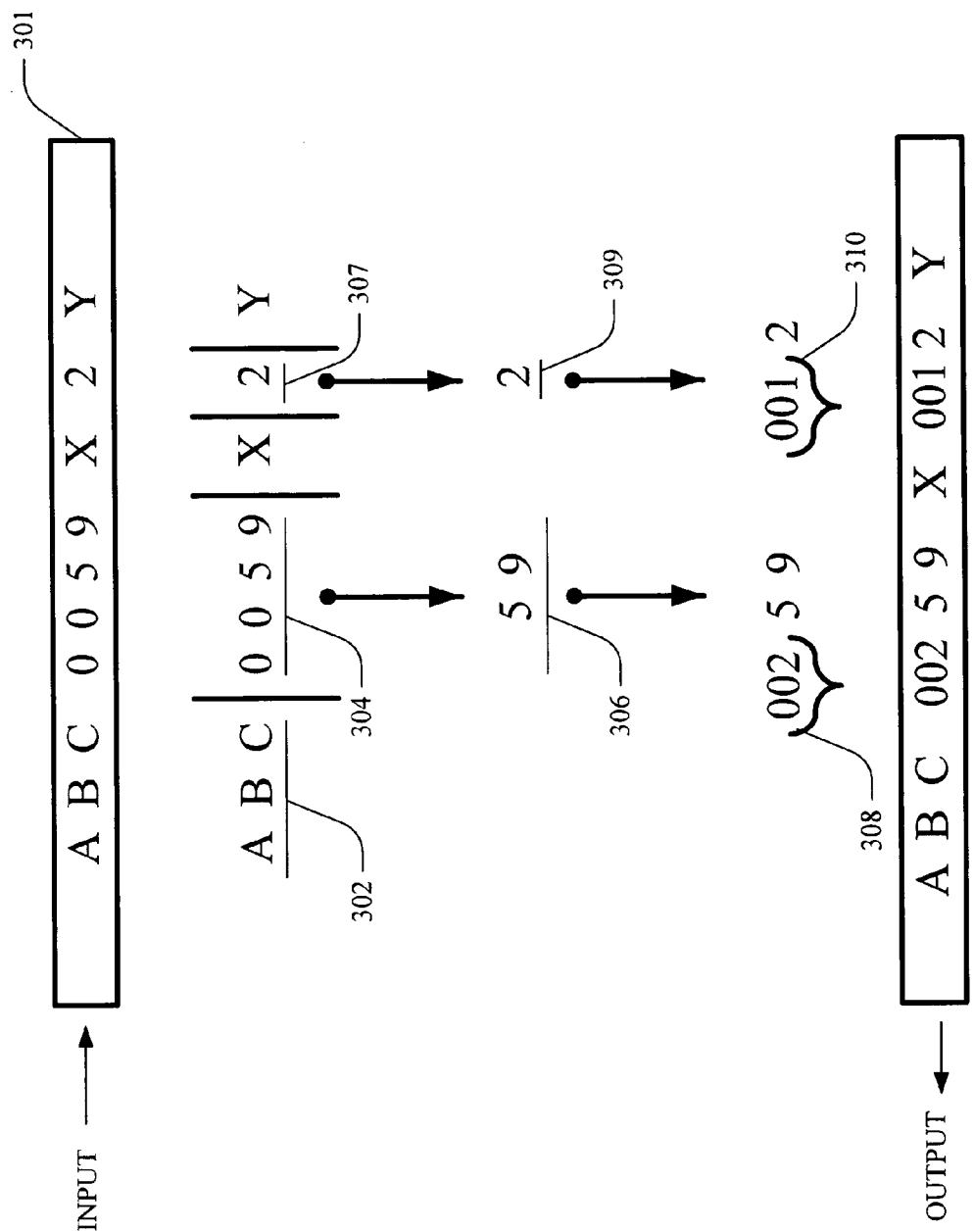
FIG. 3 illustrates a schematic of a normalization process in accordance with a particular aspect of the subject invention.

Referring now to FIG. 3 a normalization process in accordance with an aspect of the subject invention is illustrated. A text string 301 is initially introduced as an input for the normalization, wherein such text string "ABC0059X2Y", can be composed of digit and non-digit groups or sequences, each logically parsed into a respective token. Accordingly, the digit characters can be separated from the non-digit characters and form adjacent digit tokens (e.g., 304) and non digit tokens (e.g., 302). The normalization process of the subject invention can then assign values to the digit tokens 304 to provide for an intuitive sort order of the data strings, wherein a weight for the various characters relative to each other can be determined by the collation employed in the database, to sort a string before another.

As illustrated in FIG. 3, the digit token 304 comprises "0059". The normalization process of the subject invention initially strips the leading zeroes "00" that come in front of the "59" digit, to form a stripped digit group 306. As such, the digit token 304 is converted from "0059" to "59", wherein the number of digits is counted to be "2". Such count represents a significant digit associated with the normalization procedure of the subject invention. The significant digit is then placed in front of (e.g., immediately to the left of this group), to form the "252" sequence. Such significant digit can facilitate a convergence of the sort order to a logical subset of a group, (e.g., the representative digit of "2" represents numbers from 10-99, whereas a representative digit of "3" represents numbers from 100-999, and the like). The representative digit can also be part of a zero padding digit sequence that can be placed in front of the stripped digit group. The zero padding digit sequence can be a function of the length for the numeric sequence(s) of the string to be sorted. For example, the significant digit can be tailored to a database condition, to include any number of zero digits that a string to be analyzed so requires (e.g., a three digit zero padding for nine hundred-ninety-nine numbers, and the like.) For example as illustrated, the significant digit "2" can be preceded by two zeroes as part of the digit group 308.

Likewise the digit token 307 comprises the single digit "2". As such, there is no leading zeroes associated with such number, and the significant digit associated with such digit token is "1". This significant digit is then placed immediately to the left of the single digit "2" to form the "12" group. As explained earlier, a zero padding can also be employed, wherein the zero padding digit sequence can be a function of the length for the numeric sequence(s) of the string to be sorted, in this case a "00" can be employed.

Figure 4:
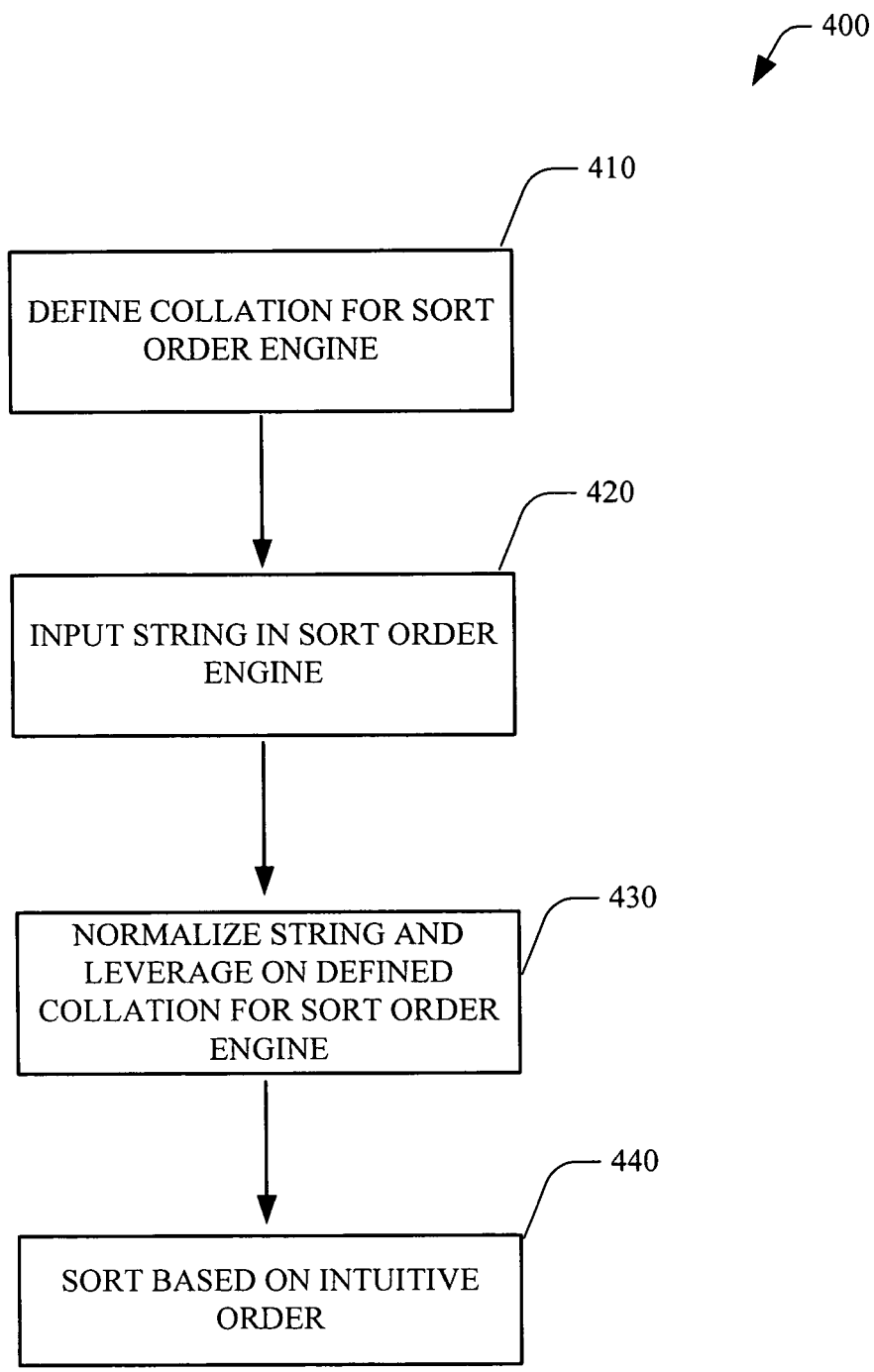
FIG. 4 illustrates a methodology of supplying an intuitive string sort order via a normalization procedure in accordance with an aspect of the subject invention.

FIG. 4 illustrates a methodology 400 of supplying an intuitive string sort order in accordance with an aspect of the subject invention. While this exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. The methodology 400 begins by defining a collation procedure for the sort order engine of the subject invention, at 410, wherein the collation determines a weight for the various characters relative to each other. Next, and at 420 a string is inputted to the sort order engine, wherein the data strings includes a sequence of characters. Such sequence of characters can be tokenized into a series of adjacent digit and non-digit tokens. Subsequently and at 430, the string can be normalized by assigning numeric values to the digit based tokens of the strings.

By normalizing the text string at 430, an intuitive sort order for the text strings can be provided, whereby in conjunction with a particular collation defined at 410, a weight for the various characters relative to each other can be determined, as to leverage on existing database systems. As such, a requirement for building a new collation that supplies an intuitive sorting of strings is mitigated, since an existing sort algorithm can be coupled with a normalization process to leverage on existing database systems. The data string can then be sorted based on an intuitive order at 440.

Figure 5:
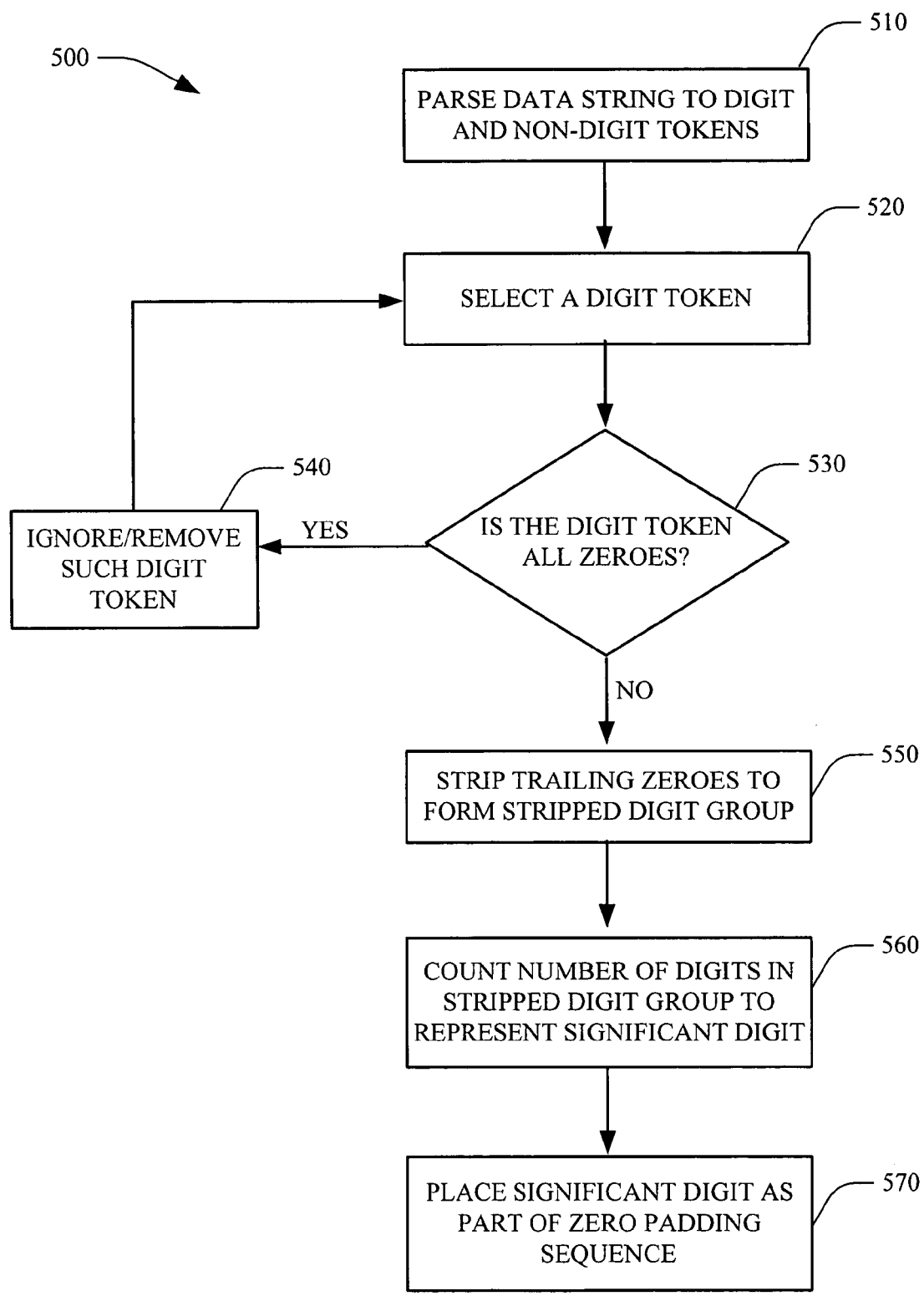
FIG. 5 illustrates a flow chart of normalizing a data string in accordance with a further aspect of the subject invention.

Referring to FIG. 5, a flow chart of normalizing a data string in accordance with an aspect of the subject invention is illustrated. The methodology 500 begins at 510, wherein a data string is parsed into digit and non-digit tokens. As explained in detail supra, the data string can include a sequence of characters, wherein the sequence of characters can be tokenized into a series of adjacent digit character(s) and non-digit character(s). Next, and at 520 a digit token is selected, and at 530 a determination is made, to verify whether all digits associated therewith is zero or not. If all digits of such token are zero, then the token is ignored and/or removed from the group of tokens, at 540. As such, the methodology returns to 520, and another digit token is selected.

Alternatively, if the selected digit token is not all zeroes, the methodology proceeds to 550. At 550, any leading zero associated with the digit token is stripped. As such, any zero digits that appear in front of the non-zero numbers are removed to form a stripped digit group as described in detail, supra. Next, the number of digits associated with such stripped group is counted, and designated as a significant digit at 560. The significant digit can be part of a zero padding digit sequence that can be placed in front of the stripped digit group. Such zero padding digit sequence can be a function of the length for the numeric sequence(s) of the string to be sorted, as illustrated at 570 and described in detail supra. The normalization of the subject invention can provide an intuitive sort order for text strings, wherein a weight for the various characters relative to each other can be determined, as to leverage on existing database systems.

FIG. 6 illustrates application of the methodology of FIG. 5 to a plurality of data strings. As illustrated at rows 602 and 604, an input of a0001x2 and a0000000001x2, both yield a same out put of a011x012, due to the fact that all preceding zeroes are stripped from the digit token. Similarly, a truncation process can result in identical out put. For example, a byte limit can be set on a length of an index sort column as part of the database management system, such that a generated value to be employed in the index is typically less than such byte limit. If the zero padding algorithm of the subject invention causes the output string to exceed the maximum byte limit size, then the output string can be truncated to the maximum permissible length, before such output is returned. In such scenarios each time the same list is sorted an identical out put can result. Accordingly, the subject invention can employ an additional column defined by the caller to cause a deterministic order. For example, the additional column can be a unique feature, such as a key column.

Likewise, strings with non-western alphabet or digit characters (e.g., Japanese, and the like) can be initially examined to distinguish the digits from the non-digits. Next and to sort such string, the normalization can be applied to the digit characters of the string or their western digit equivalent. Similarly, the subject invention can be employed for sorting dates based on a variant sort algorithm (e.g., for variant data types) that ranks a date relative to an integer. Accordingly, user defined date formats (e.g., date-month-year, year-month-date, and the like) can be sorted via the subject invention.

Figure 7:
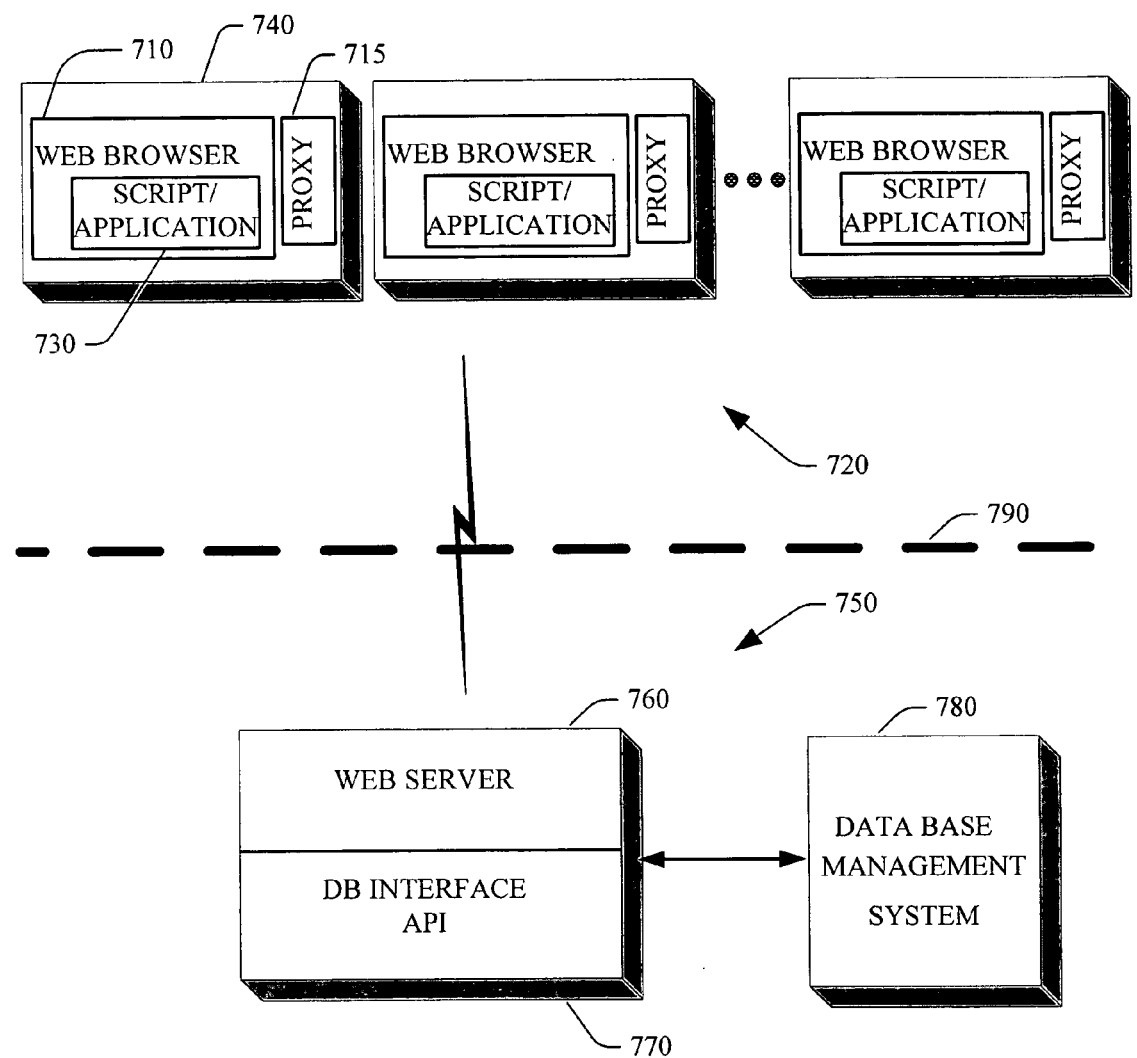
FIG. 7 illustrates a block diagram of a client-server network that can employ particular normalization aspects of the subject invention.

FIG. 7 illustrates a block diagram of a client server network that can employ particular normalization aspects of the subject invention, wherein running on each of the clients 720 can be a client process, for example, a web browser 710. Likewise, running on the server 750 can be a corresponding server process, for example, a web server 760. In addition, embedded in the Web Browser 710 can be a script or application 730, and running within the run-time environment 740 of the client computer 720, can exist a proxy 715 for packaging and unpacking data packets formatted. Communicating with the server 750 is a database management system (DBMS) 780, which manages access to a database (not shown). The DBMS 780 and the database (not shown) can be located in the server itself, or can be located remotely on a remote database server (not shown). Running on the Web server 760 is a database interface Applications Programming Interface (API) 770, which provides access to the DBMS 780. Such API 770 can support sorting for Item Searchers and Application Views via specifying a sort expression. For example such an expression can be a field name or a complex expression. Thus, if a developer currently specifies a sort expression "DisplayName", then to sort by the same field using natural sort order, such expression can be "Normalized Digits (DisplayName)". For example:

ItemSearcher searcher=new ItemSearcher ( );
    searcher.SortOptions.Expression="NormalizeDigits(DisplayName)";
    searcher.SortOptions.Order=SortOrder.Descending;

Moreover functions can be provided in the API 770 that map to SQL functions (e.g., "Like"), and expose NormalizedDigits in a same manner. For example:

namespace System.Storage.Helpers {
    public static class StoreMethods {
    public bool Like (string s, string t);
    public string NormalizedDigits(string s);

The client computer 720 and the server computer 750 can communicate with each other through a network 790. It is to be appreciated that other arrangements are also possible, for example the client computer and the server computer being the same computer. When the client process, e.g., the Web browser 710, requests data from a database, the script or application 730 issues a query, which is sent across the network (e.g. internet) 790 to the server computer 750, where it is interpreted by the server process, e.g., the Web server 760. The client's 720 request to server 750 can contain multiple commands, and a response from server 750 can return a plurality of result sets. In such communication, session, presentation, and application service elements can be provided by Tabular Data Stream (TDS). Since TDS does not require any specific transport provider, it can be implemented over multiple transport protocols and the network 790. Responses to client commands that are returned can be self-describing, and record oriented; (e.g., the data streams can describe names, types and optional descriptions of rows being returned.)

On the client side 720 the data can be a Structured Query Language (SQL) command being in a language that the server side 750 can accept, a SQL command followed by its associated binary data (e.g., the data for a bulk copy command), or an attention signal. When a connection is desired, the client 720 can send a connection signal to the server. Even though the client 720 can have more than one connection to the server 750, each connection path can be established separately and in the same manner.

Figure 8:
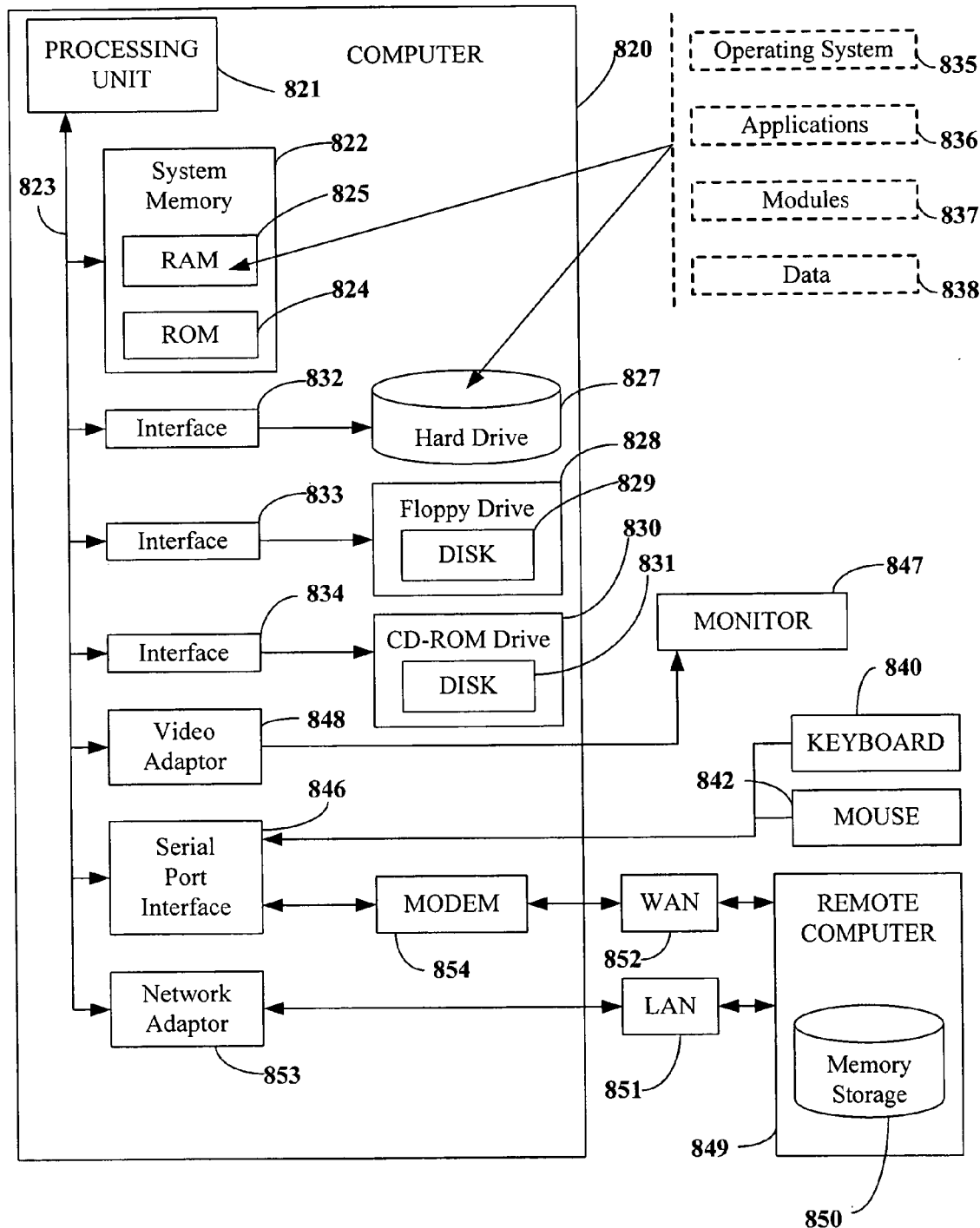
FIG. 8 illustrates a brief, general description of a suitable computing environment wherein the various aspects of the subject invention can be implemented.

Referring now to FIG. 8, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules.

Generally, program modules include routines, programs, components, data structures, and the like, that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 820, including a processing unit 821, a system memory 822, and a system bus 823 that couples various system components including the system memory to the processing unit 821. The processing unit 821 can be any of various commercially available processors. Dual microprocessors and other multi-processor architectures also can be used as the processing unit 821.

The system bus can be any of several types of bus structure including a memory bus or memory controller, a peripheral bus, and a local bus using any of a variety of commercially available bus architectures. The system memory may include read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading from or writing to a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 825, including an operating system 835, one or more application programs 836, other program modules 837, and program data 838. The operating system 835 in the illustrated computer can be substantially any commercially available operating system.

A user can enter commands and information into the computer 820 through a keyboard 840 and a pointing device, such as a mouse 842. Other input devices (not shown) can include a microphone, a joystick, a game pad, a satellite dish, a scanner, or the like. These and other input devices are often connected to the processing unit 821 through a serial port interface 846 that is coupled to the system bus, but may be connected by other interfaces, such as a parallel port, a game port or a universal serial bus (USB). A monitor 847 or other type of display device is also connected to the system bus 823 via an interface, such as a video adapter 848, and be employing the various aspects of the invention as described in detail supra. In addition to the monitor, computers typically include other peripheral output devices (not shown), such as speakers and printers. The power of the monitor can be supplied via a fuel cell and/or battery associated therewith.

The computer 820 can operate in a networked environment using logical connections to one or more remote computers, such as a remote computer 849. The remote computer 849 may be a workstation, a server computer, a router, a peer device or other common network node, and typically includes many or all of the elements described relative to the computer 820, although only a memory storage device 850 is illustrated in FIG. 8. The logical connections depicted in FIG. 8 may include a local area network (LAN) 851 and a wide area network (WAN) 852. Such networking environments are commonplace in offices, enterprise-wide computer networks, Intranets and the Internet.

When employed in a LAN networking environment, the computer 820 can be connected to the local network 851 through a network interface or adapter 853. When utilized in a WAN networking environment, the computer 820 generally can include a modem 854, and/or is connected to a communications server on the LAN, and/or has other means for establishing communications over the wide area network 852, such as the Internet. The modem 854, which can be internal or external, can be connected to the system bus 823 via the serial port interface 846. In a networked environment, program modules depicted relative to the computer 820, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 828, and CD-ROM 831) to thereby reconfigure or otherwise alter the computer system's operation, as well as other processing of signals. The memory locations wherein such data bits are maintained are physical locations that have particular electrical, magnetic, or optical properties corresponding to the data bits.

Figure 9:
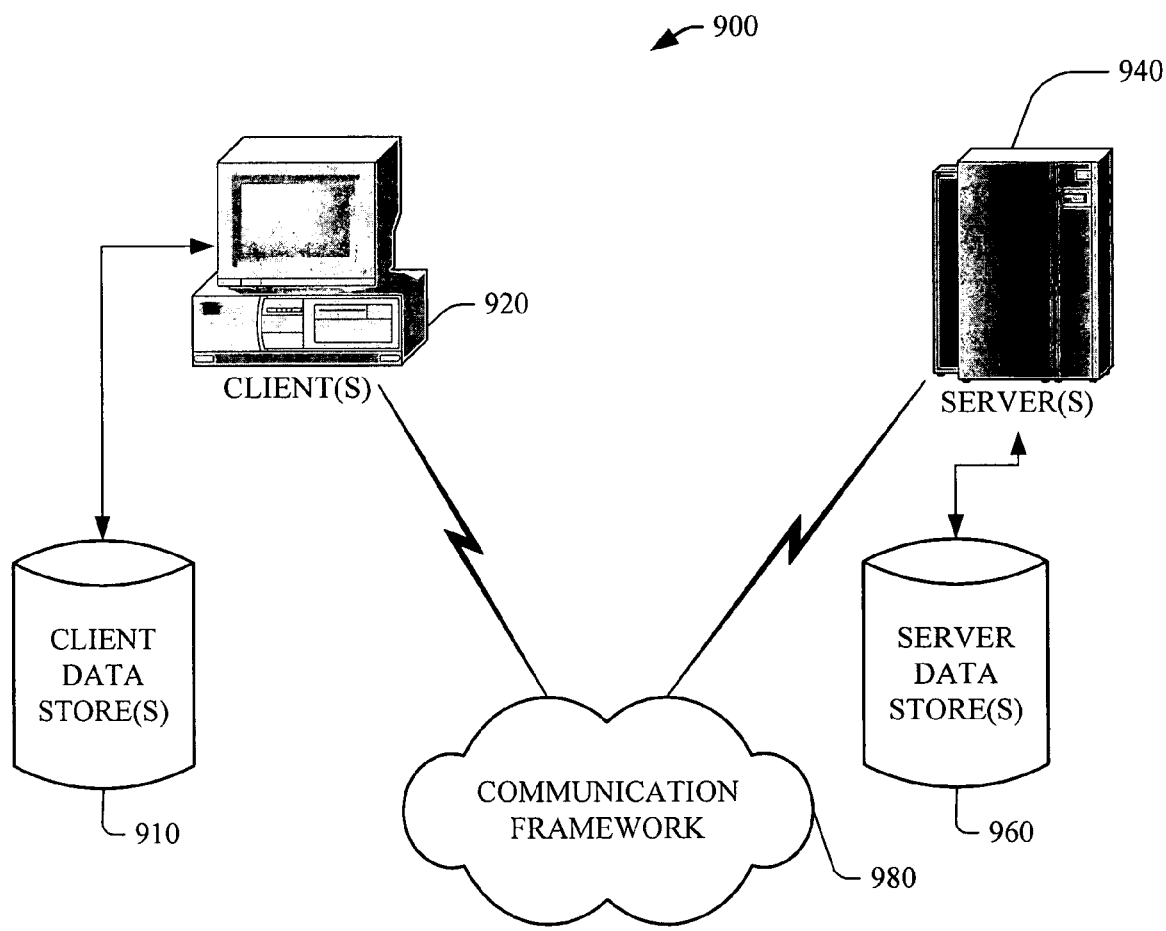
FIG. 9 illustrates a system that can employ various aspects of the subject invention for sorting data strings in accordance with the subject invention.

Referring now to FIG. 9 a client—server system 900 that can employ various aspects of the subject invention for sorting data strings, is illustrated. The client(s) 920 can be hardware and/or software (e.g., threads, processes, computing devices). The system 900 also includes one or more server(s) 940. The server(s) 940 can also be hardware and/or software (e.g., threads, processes, computing devices). The client 920 and the server 940 can communicate, in the form of data packets transmitted according to the subject invention, between two or more computer processes. As illustrated, the system 900 includes a communication framework 980 that can facilitate communications between the client(s) 920 and the server(s) 940, and/or the respective display monitors. The client(s) 920 is operationally connected to one or more client data store(s) 910 that can store information local to the client (s) 920. Moreover, client 920 can access and update databases 960 located on a server computer 940 running a server process. In one aspect of the subject invention, the communication frame work 980 can be the Internet, with the client process being a Web browser and the server process being a Web server.

As such, a typical client 920 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 940 can be university or corporate mainframe computers, or dedicated workstations, and the like.

Moreover, although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A computer-implemented sort order engine, comprising:
    a processor that executes the following computer-executable components stored in memory to sort text strings in accordance with a specified collation, including:
    a normalization component that:
        accesses a plurality of data strings, each data string including a sequence of characters, the characters selected from among numeric and alphabetic characters;
        for each data string in the plurality of data strings:
            parses the data string into a series of adjacent numeric tokens and alphabetic tokens, the numeric tokens including adjacent numeric characters and the alphabetic tokens including adjacent alphabetic characters;
            for each numeric token in the data string:
                count the number of significant digits in the numeric token, the count of the number of significant digits indicating the length of the numeric token, the count ignoring any leading zeroes of the numeric token; and
                pre-pends a numeric value representing the count of the number of significant digit in the numeric token to the numeric token by inserting the numeric value into the data string prior and adjacent to the numeric token within the data string such that one or more of the numeric value and numeric token to sort the data string, wherein the numeric value sorts numeric token based on the length of the numeric token without having to re-parse the numeric token; and a collation component that sorts the plurality of data strings in accordance with the specified collation based at least in part on the length of the numeric tokens included in the pre-pend numeric values.

2. The computer-implemented sort order engine of claim 1, wherein the at least on numeric token comprises a sequence of leading zeroes.

3. The computer-implemented sort order engine of claim 2, wherein the leading zeroes are stripped from the at least one numeric token to form stripped digit groups.

4. At a computer system including a processor and system memory, the method for sorting text strings in accordance with a specified collation, the method comprising:

accesses a plurality of data strings, each data string including a sequence of characters, the characters selected from among numeric and alphabetic characters;

for each data string in the plurality of data strings:

parses the data string into a series of adjacent numeric tokens and alphabetic tokens, the numeric tokens including adjacent numeric characters and the alphabetic tokens including adjacent alphabetic characters;

for each numeric token in the data string:

the processor counting the number of significant digits in the numeric token, the count of the number of significant digits indicating the length of the numeric token, the count ignoring any leading zeroes of the numeric token; and pre-pends a numeric value representing the count of the number of significant digit in the numeric token to the numeric token by inserting the numeric value into the data string prior and adjacent to the numeric token within the data string such that one or more of the numeric value and numeric token to sort the data string, wherein the numeric value sorts numeric token based on the length of the numeric token without having to re-parse the numeric token; and sorting the plurality of data strings in accordance with the specified collation based at least in part on the length of the numeric tokens included in the pre-pend numeric values.

5. The method of claim 4, wherein sorting includes sorting the one or more strings as a function of integer comparison on respective assigned numeric values.

6. The method of claim 4, further comprising assigning numeric values to numeric tokens represented as non-western numeric characters based upon western numeric character equivalents.

7. The method of claim 4 further comprising ranking the data strings with a date format based on a variant sort algorithm.

8. The method of claim 4, further comprising striping leading zeroes from a group of numbers associated with at least one numeric token, to form a stripped digit group.

9. The method of claim 4, further comprising determining whether a numeric token is all zeroes, and if so, ignoring the digit token.

10. The method of claim 8, further comprising counting a number of digits in the stripped digit group, to represent a significant digit number.

11. The method of claim 10 further comprising padding the significant digit with zeroes.

12. The method of claim 10, further comprising employing the significant digit to converge a sort order to a logical subset.

13. A computer program product usable at a computer system, the computer program product for implementing a method for sorting text strings in accordance with a specified collation, the computer program product comprising one or more computer storage media having stored there on computer-executable instructions that, when executed at a processor, cause the computer system to perform the method, including the following:

accesses a plurality of data strings, each data string including a sequence of characters, the characters selected from among numeric and alphabetic characters;

for each data string in the plurality of data strings:

parse the data string into a series of adjacent numeric tokens and alphabetic tokens, the numeric tokens including adjacent numeric characters and the alphabetic tokens including adjacent alphabetic characters;

for each numeric token in the data string:

counting the number of significant digits in the numeric token, the count of the number of significant digits indicating the length of the numeric token, the count ignoring any leading zeroes of the numeric token; and pre-pending a numeric value representing the count of the number of significant digit in the numeric token to the numeric token by inserting the numeric value into the data string prior and adjacent to the numeric token within the data string such that one or more of the numeric value and numeric token to sort the data string, wherein the numeric value sorts numeric token based on the length of the numeric token without having to re-parse the numeric token; and sort the plurality of data strings in accordance with the specified collation based at least in part on the length of the numeric tokens included in the pre-pend numeric values.

* * * * *